United States Patent [19]

Henning

[11] 4,106,795
[45] Aug. 15, 1978

[54] GROUND SUPPORTED FRONT MOUNTED TRACTOR ATTACHMENT

[76] Inventor: James Henning, R.F.D. 1, Hennepin, Ill. 61327

[21] Appl. No.: 712,099

[22] Filed: Aug. 5, 1976

[51] Int. Cl.² .............................................. B60D 3/00
[52] U.S. Cl. .................................... 280/481; 172/277
[58] Field of Search .................. 280/481, 492, 460 R; 239/147, 172, 176; 172/277, 807; 37/DIG. 20; 180/14 R

[56] References Cited

U.S. PATENT DOCUMENTS

| 2,736,576 | 2/1956 | Blada | 280/492 X |
| 2,980,443 | 4/1961 | Fina | 172/277 X |
| 3,033,593 | 5/1962 | Zaha | 280/460 R |
| 3,138,210 | 6/1964 | Behrens | 172/277 |
| 3,900,201 | 8/1975 | Johnson | 280/481 X |

FOREIGN PATENT DOCUMENTS 658,781  6/1948  United Kingdom ..................... 280/492

Primary Examiner—John A. Pekar
Attorney, Agent, or Firm—Zarley, McKee, Thomte, Voorhees & Sease

[57] ABSTRACT

A front mounted ground supported tractor attachment, steerable with and pushed by the tractor, includes a portable frame supported on caster wheels and a drive linkage connected between the frame and tractor for pivotal movement of the frame about both a transverse axis and a longitudinal axis relative to the tractor. The drive linkage transmits the forward motion of the tractor to the frame and the caster wheels allow the frame to turn with the tractor as it is steered in the usual manner. A pair of elongated push members on the drive linkage help push the frame while permitting it to pivot or swivel about the longitudinal axis. Abutment means limits the downward and forward pivotal movement of the frame relative to the tractor for safety.

6 Claims, 12 Drawing Figures

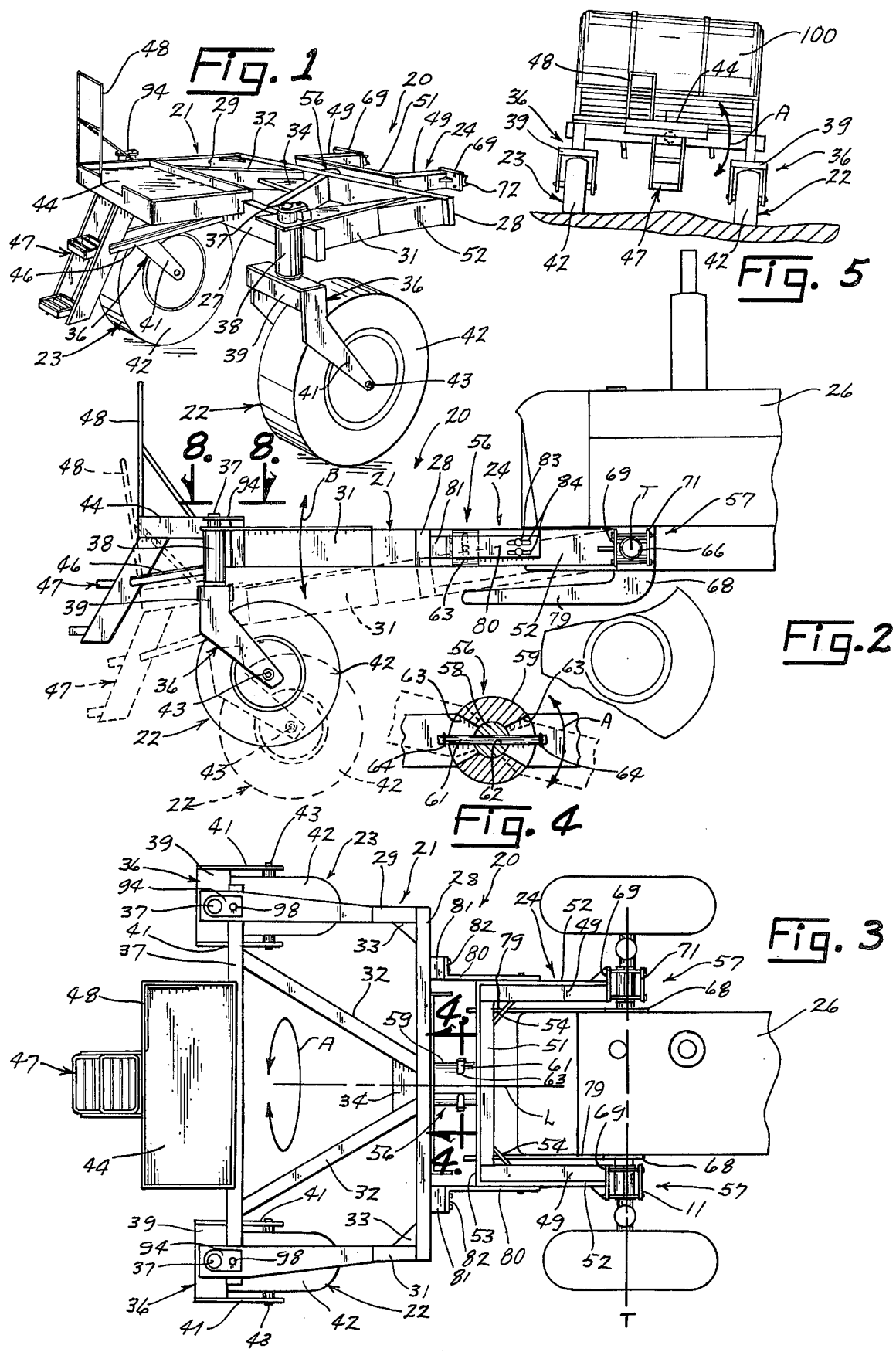

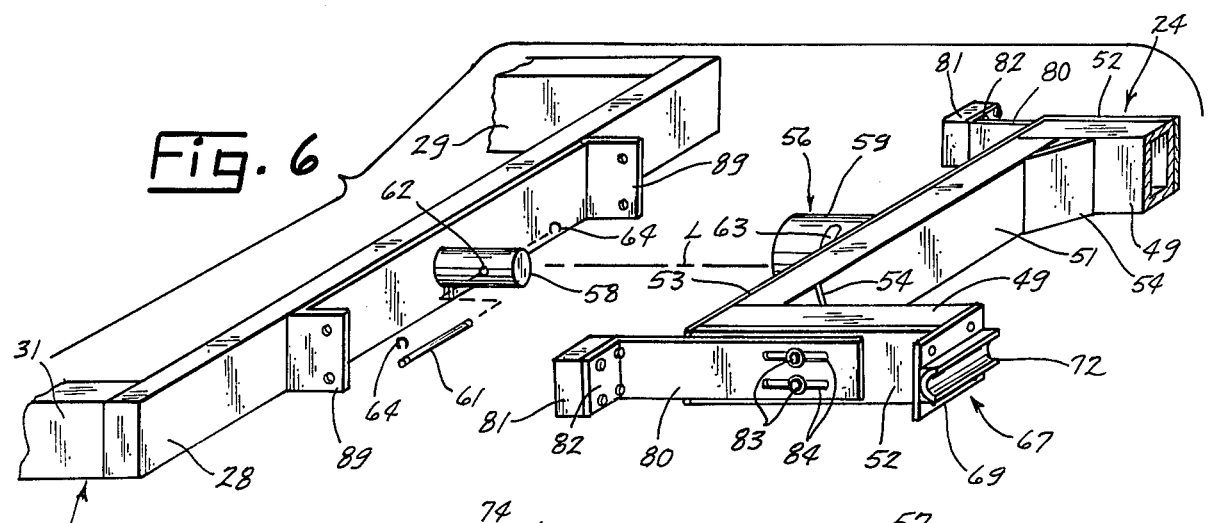
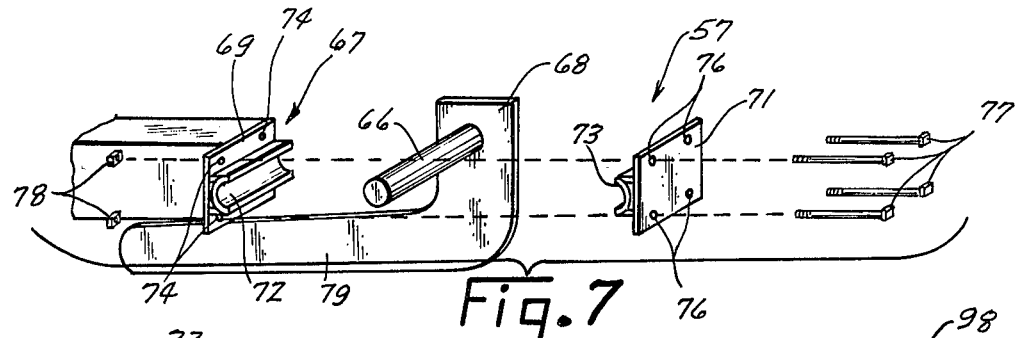
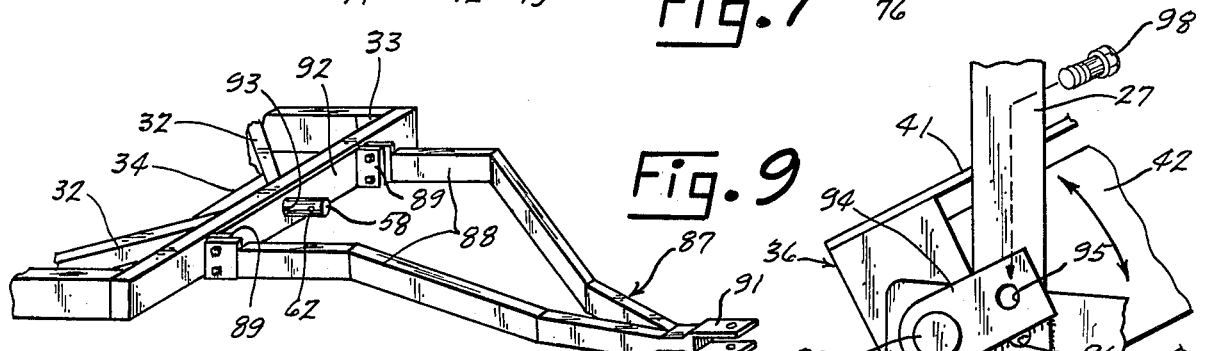
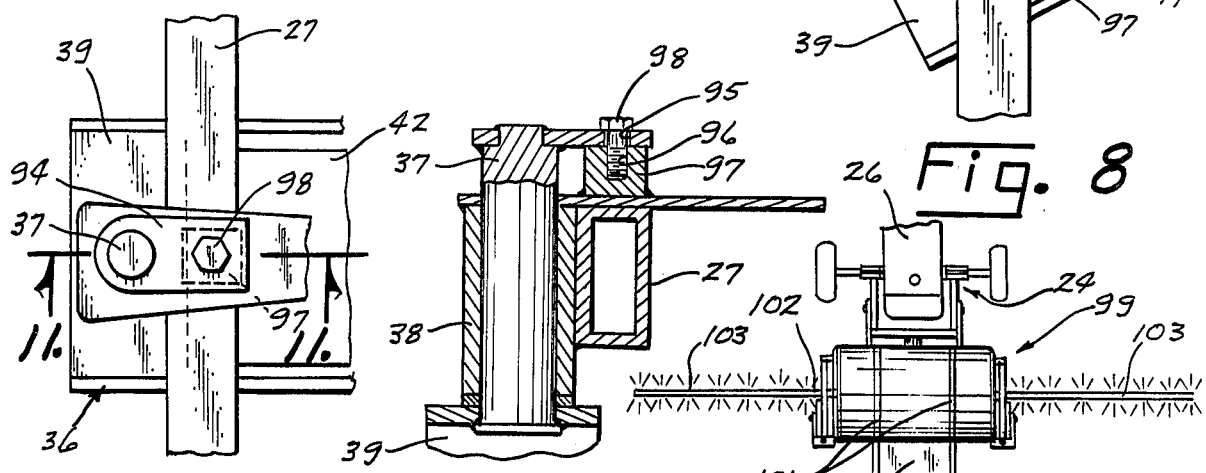

GROUND SUPPORTED FRONT MOUNTED TRACTOR ATTACHMENT

SUMMARY OF THE INVENTION

The front mounted and ground supported tractor attachment of the present invention is of compact and rugged construction and effective to support a large load in front of and substantially free of the tractor itself. The portable frame, supported on a pair of caster wheels, is mounted in front of the tractor with freedom of pivotal movement about both a transverse and longitudinal axis so as to provide a substantially independent suspension means for the load on the push frame. Thus, while being steerable with the tractor, the frame is free to swivel and vertically pivot relative to the tractor so that the caster wheels remain in load bearing ground engagement regardless of irregularities in the terrain over which the tractor is driven. Because the load on the attachment is not carried on the tractor, a substantially heavy load may be transported as compared to the loads capable of being carried on conventional belly mounted or front-mounted tractor equipment. In this respect, the load on the attachment does not substantially increase soil compaction by the tractor wheels nor cause the tractor to exceed recommended weight limits. When equipped with a sprayer apparatus, the portable frame of the present invention is capable of supporting a larger tank than conventional tractor mounted units, thereby enabling the farmer to cover additional acres between tank refills.

Attachment and detachment of the push frame from the tractor is accomplished quickly and easily by a single pair of quick lock brackets, thereby minimizing tractor down time for installation. Because the push frame is so easily detached, it need not tie up a tractor to prevent its use for other operations.

BRIEF DESCRIPTION OF THE DRAWINGS

FIG. 1 is a perspective view of the front mounted tractor attachment of the present invention;

FIG. 2 is a longitudinal view of the tractor attachment in assembly relation with a tractor;

FIG. 3 is a plan view of the tractor and attachment of FIG. 2;

FIG. 4 is a transverse sectional view of the swivel coupling between the frame and drive linkage, taken on line 4—4 in FIG. 3;

FIG. 5 is a transverse front view of the tractor attachment with a large sprayer tank supported thereon;

FIG. 6 is a perspective view of the swivel coupling between the frame and drive yoke member;

FIG. 7 is a perspective view of one of the vertically pivotal couplings between the drive linkage and tractor;

FIG. 8 is a plan view of the axle locking mechanism for one of the caster wheels looking in the direction of line 8—8 in FIG. 2;

FIG. 9 is a perspective view of the frame with a rear hitch assembly substituted for the drive linkage;

FIG. 10 is a plan view of the axle locking mechanism, similar to FIG. 8, with the caster wheels locked in a straight ahead position;

FIG. 11 is a longitudinal sectional view of the caster wheel axle locking mechanism taken along line 11—11 in FIG. 10; and FIG. 12 is a plan view of the tractor attachment in assembly relation with a tractor and operatively supporting a sprayer apparatus.

DESCRIPTION OF THE INVENTION

Referring to FIG. 1, the front mounted tractor attachment, indicated generally at 20, includes a portable frame 21 which is supported on a pair of transversely spaced caster wheel assemblies 22 and 23. A drive linkage 24 connects the frame to the tractor for pivotal movement of the frame about both a transverse and longitudinal axis relative to the tractor. More specifically, when the attachment 20 is connected to a tractor 26, as shown in FIG. 3, it is steerable with and pushed by the tractor 26, while at the same time being free to swivel about a longitudinal axis, indicated by line L and pivot up and down about a transverse axis, indicated by line T.

The portable frame 21, shown best in FIGS. 1 and 3, includes a rectangular structure of rectangle section tubing including a front frame member 27, a rear frame member 28, and a pair of frame side members 29 and 31. Longitudinal reinforcement for the frame 21 is provided by a pair of forwardly diverging brace members 32. Rear corner gussets 33 and a brace member gusset 34 are secured in the positions shown in FIG. 3 to further strengthen the portable frame 21.

The caster wheel assemblies 22 and 23 are supported on the frame 21 at transversely spaced positions relative to the tractor 26, as shown in FIGS. 1 and 3. Because both caster wheel assemblies 22 and 23 are alike, only one of them will be described in detail with like numbers referring to like parts. Each caster wheel assembly includes a fork member 36 (FIG. 1) having an upright stub shaft 37 pivotally received within a caster wheel bearing sleeve 38 on the front frame member 27. The lower portion of the fork member 36 is an inverted U-shaped member 39 having opposite legs 41 between which a ground wheel 42 is rotatably supported on a wheel shaft 43. The legs 41 are inclined relative to the axis of the stub shaft 37 to position the center of the ground wheel 42 behind the stub shaft 37, thereby providing the caster effect for rotation of the caster wheel assembly within the bearing sleeve 38 in response to steering movement of the tractor 26.

A horizontal landing 44 (FIG. 1) is also supported on the front frame member 27 between the caster wheel assemblies 22 and 23 to provide access by an operator to a load carried on the frame 21. The front of the landing 44 is supported by a pair of support rods 46 connected at one end to the frame front member 27 and at the other end to a ladder like structure 47 suspended from the front of the landing 44 for climbing onto the landing. An upright railing 48 is secured at the front of the landing 44 for the operator's safety.

The drive linkage 24, which connects the portable frame 21 to the tractor 26 as shown in FIGS. 3 and 6, is a U-shaped member including a pair of elongated transversely spaced leg members 49 and a transverse drive linkage cross member 51 extended between and connected to front end portions of the legs 49. The exterior surfaces of the drive linkage legs 49 and cross-member 51 are reinforced by respective face plates 52 and 53 welded thereon. Likewise, a pair of upright gusset plates 54 are secured across the inside corners where the legs 49 meet the crossmember 51 to rigidify the connection between them.

The connections between the portable frame 21 and tractor 26 include first coacting means 56 on the frame 21 and drive linkage 24 which provides for pivotal movement of the frame 21 about the longitudinal axis L and second coacting means 57 on the drive linkage 24 and tractor 26 which provides for up and down pivotal movement of the frame 21 about the transverse axis T.

The first coacting means 56 is a swivel coupling, shown in unassembled form in FIG. 6 as including a longitudinally extended pivot shaft 58 on the rear frame member 28 and a longitudinally extended cylindrical sleeve 59 on the front of the drive linkage crossmember 51 for pivotally receiving the pivot shaft 58 in axial alignment within it. To fix the pivot shaft 58 longitudinally within the cylindrical sleeve 59, thereby preventing its withdrawal, a locking pin 61 is insertable through a hole 62 extended transversely through the pivot shaft 58 when the hole 62 is longitudinally aligned between a pair of vertical slots 63 in opposite sides of the cylindrical sleeve 59. Thus, the opposite ends of the locking pin 61 are slidably engageable within the vertical slots 63 to provide limited pivotal or swivel movement of the pivot shaft 58 about axis L. Snap rings 64 or other suitable fasteners are applied onto the ends of the locking pin 61 to prevent its accidental withdrawal from the swivel coupling 56.

The second coacting means 57 between the drive linkage 24 and tractor 26 is shown in FIG. 3 as including a pair of push pins 66 adopted to be mounted in axial alignment on opposite sides of the tractor 26 and a pair of quick-lock brackets 67 on the terminal ends of the drive linkage leg members 49. Since the quick-lock brackets 67 are both the same, only one is described in detail and shown in FIG. 7, with like numbers referring to like parts.

The push pin 66 (FIG. 7) has affixed to one end a mounting plate 68 which is inclined perpendicular to the axis of the push pin 66. Plate 68 is adapted to be secured to the frame of the tractor 26 for transmitting the pushing force of the tractor to attachment 20 through the push pins 66.

Each quick lock bracket 67 (FIG. 7) includes a pair of upright plates 69 and 71, each having a respective half sleeve member 72 and 73 secured transversely across one side of the plate. Above and below the half sleeve members 72 and 73, the plates are provided with respective bolt holes 74 and 76 through which the bolts 77 are extended to lock the plates together with the push pin 66 in bearing engagement between the half sleeve members 72 and 73. Whereas the ends of the outer bolts 77 are accessible for applying a pair of nuts 78, the inner holes of plate 69 are threaded to receive the inner bolts 77 because these holes are covered by the drive linkage legs 49. The bearing surfaces of the half sleeve members 72 and 73 are greased to prevent wear and reduce friction with the push pins 66.

Thus, all that is required to connect the tractor attachment 20 to a tractor 26 equipped with the push pins 66, is to fasten the two quick lock brackets 67 onto the respective push pins 66. When thus connected, the first coating means or swivel coupling 56 provides for pivotal movement of the frame 21, as indicated by arrow A in FIGS. 3, 4 and 5, about longitudinal axis L and the second coacting means 57, including the quick load brackets 67, provides for pivotal movement of the frame 21, as indicated by arrow B in FIG. 2, about transverse axis T.

It can be seen in FIG. 7 that each push pin mounting plate 68 includes a lower portion or safety bar 79 which protrudes forwardly of the tractor for limiting the downward pivotal movement of the frame 21. When the tractor attachment 20 pivots downwardly to the dotted line position in FIG. 2, the drive linkage crossmember 51 abuts against the forward ends of the safety bars 79. Thus, in the event that the tractor attachment 20 is inadvertently pushed into a deep ditch or the like, the tractor is prevented from running over the suspended attachment 20.

As thus far described, the pushing force of the tractor 26 is transmitted from the drive linkage 24 to the portable frame 21 entirely by means of the swivel coupling 56. To relieve the stress on the swivel coupling, a pair of push members 80 (FIG. 6) are connected to opposite sides of the drive linkage leg members 49. The push members protrude forwardly of the drive linkage 24 to engage the portable frame 21 at transversely spaced positions as indicated in FIG. 3. Thus, at least part of the pushing force of the tractor is transmitted to the frame 21 through the push members 80 when the tractor is driven straight ahead, and on turns, the push members 80 reduce the bending stress on the swivel coupling 56. It is important to note that the push members 80 simply abut against the portable frame 21 so as not to prevent swivel movement of the frame through the coupling 56. Because of the resultant frictional engagement with the frame 21, the push members 80 include a pair of wear plates 81 fastened to respective bent end portions 82 of the push members. The wear plates 81 are made of a soft material such as aluminum so as to prevent wear of the rear frame member 28. As the thickness of the wear plates 81 is reduced due to wear, the push member 79 must be adjusted longitudinally on the drive linkage in order to maintain engagement with the portable frame 21. Accordingly, the rear ends of the push members 80 are provided with a pair of parallel slots 84 through which a pair of bolts 83 are insertable for attachment to the drive linkage leg members 49, thereby forming a longitudinally adjustable connection to compensate for plate wear.

Because the tractor attachment 20 may be adapted for various uses, an operator may desire to pull the tractor attachment 20 behind his tractor for use as a trailer or the tool carrying portion of an implement. For such purposes, the drive linkage 24 is easily detached from the portable frame 21 upon the removal of the locking pin 61 of the swivel coupling 56. In place of the drive linkage 24, a tongue member 87 is fastened to the portable frame 21 for connecting it to the usual hitch bar on the back of a tractor. The tongue member 87 has a pair of elongated tubing members 88 connected at one end to respective tongue member brackets 89 on the frame 21 with the other ends converging downwardly and inwardly therefrom for connection to the clevis hitch connector 91. The tongue member brackets 89 are simply bent end portions of a reinforcing plate 92 which is welded onto the rear frame member 28. The plate 92 has a centrally located hole 93 which allows the plate to be fitted over the pivot shaft 58 which is thereby reinforced relative to the rear frame member 28.

It is also necessary to lock the caster wheel assemblies 22 and 23 in a straight ahead position in order to prevent the tractor attachment 20 from swaying from side to side behind a tractor to which it is connected by the tongue member 87. Accordingly, a rock arm 94 (FIGS. 8 and 11) is fixed on the upper end of each caster wheel stub shaft 37 for rotation therewith. A hole 95 is formed in a terminal end portion of the rock arm 94 and adapted to be alignable with a corresponding hole 96 in a rock arm bracket 97 secured to the frame 21 longitudinally behind the axis of the caster wheel stub shafts 37. Accordingly, when the caster wheel assemblies 22 and 23 are rotated on the stub shafts 37 to a position where the wheel shafts 43 are directed transversely of the frame 21, the holes 95 and 96 of the rock arm 94 and bracket 97 are aligned allowing the insertion of a bolt 98 to releasably lock the caster wheel assemblies in the straight ahead position.

Referring again to its primary intended use as a front mounted push type tractor attachment, the present invention is particularly suitable for use as a supporting structure of a sprayer implement, indicated generally at 99 in FIG. 12. For this purpose, a large tank 100 is supported on the portable frame 21 and secured in position by a pair of straps 101. An elongated spraying boom 102 is supported on the underside of the portable frame 21 behind the caster wheel assemblies 22 and 23 and has a pair of elongated extensions hingedly connected to opposite ends thereof to extend the length of the boom 102 when the extensions are lowered for spraying as shown in FIG. 12. The hydraulic pump (not shown) for the sprayer apparatus may similarly be supported on the underside of the frame directly behind the ladder-like structure 47 so as to be situated between rows of crops being sprayed. The sprayer implement 99 thus described is quickly and easily attached to and detached from the tractor since the only connections are the two quick lock brackets 67 of the drive linkage 24 and the hydraulic line (not shown) from the sprayer pump to the hydraulic system of the tractor.

Although the invention has been described with respect to a preferred embodiment thereof, it is to be understood that it is not to be so limited since changes and modifications can be made therein which are within the full intended scope of this invention as defined by the appended claims.

I claim:

1. A front mounted vehicle attachment steerable with and pushed by a vehicle, comprising:
   (a) a portable frame positionable forwardly of the vehicle,
   (b) a pair of caster wheels,
   (c) means for supporting the caster wheels on the frame at transversely spaced positions relative to the vehicle,
   (d) a drive linkage between the frame and vehicle,
   (e) means for connecting the frame to the drive linkage for pivotal movement of the frame about a generally longitudinal axis relative to the vehicle, including:
      (1) a pivotal shaft connected at one end to the frame so as to extend rearwardly therefrom,
      (2) a cylindrical sleeve connected to a front portion of the drive linkage for pivotally receiving the pivot shaft in axial alignment therewith, and
      (3) means for releasably longitudinally securing the pivot shaft within the sleeve, comprising an elongated pin insertable through a hole provided therefor in the pivot shaft with opposite ends of the pin slidably engageable within generally vertical slots in opposite sides of the cylindrical sleeve to provide limited pivotal movement of the pivot shaft about an axis extended through the sleeve generally longitudinally of the vehicle, and
   (f) means for connecting the drive linkage to the vehicle for pivotal movement of the frame about a generally transverse axis relative to the vehicle.

2. A front mounted vehicle attachment steerable with and pushed by a vehicle, comprising:
   (a) a portable frame positionable forwardly of the vehicle,
   (b) a pair of caster wheels,
   (c) means for supporting the caster wheels on the frame at transversely spaced positions relative to the vehicle,
   (d) a drive linkage between the frame and vehicle,
   (e) coacting means on the drive linkage, frame and vehicle providing for pivotal movement of the frame about both a generally longitudinal axis and a generally transverse axis relative to the vehicle,
   (f) a pair of elongated push members, and
   (g) means for connecting one end of the push members to the drive linkage at transversely spaced positions with the opposite ends protruding toward the frame for frictional engagement therewith whereby the forward motion of the vehicle is transmitted to the frame without preventing pivotal movement thereof.

3. A front mounted vehicle attachment, according to claim 2, comprising:
   (a) a pair of wear plates, and
   (b) means for attaching the wear plates to respective opposite ends of the push members,
   (c) said means for connecting the push members to the drive linkage being longitudinally adjustable to compensate for plate wear.

4. A front mounted vehicle attachment steerable with and pushed by a vehicle, comprising:
   (a) a portable frame positionable forwardly of the vehicle,
   (b) a pair of caster wheels,
   (c) means for supporting the caster wheels on the frame at transversely spaced positions relative to the vehicle,
   (d) a drive linkage between the frame and vehicle,
   (e) coacting means on the drive linkage, frame and vehicle providing for pivotal movement of the frame about both a generally longitudinal axis and a generally transverse axis relative to the vehicle, and
   (f) abutment means rigidly connected to the vehicle and extended forwardly thereof below said drive linkage,
   (g) said drive linkage, in response to downward pivotal movement of said frame about said transverse axis, abuttable with said abutment means to suspend the frame thereon and prevent further downward pivotal movement of the frame relative to the vehicle.

5. A front mounted vehicle attachment steerable with and pushed by a vehicle, comprising:
   (a) a portable frame positionable forwardly of the vehicle,
   (b) a pair of caster wheels,
   (c) means for supporting the caster wheels on the frame at transversely spaced positions relative to the vehicle,
   (d) a drive linkage between the frame and vehicle including a generally U-shaped structure having a pair of spaced-apart legs with free end portions directed toward the vehicle and a cross member connected at each of its ends to a respective one of the legs,
   (e) coacting swivel connector means on the drive linkage and frame for pivotal movement of the frame about a generally longitudinal axis relative to the vehicle, (f) coacting pivotal connector means on the vehicle and on the free end portions of the drive linkage legs for providing up and down pivotal movement of the frame about a generally transverse axis relative to the vehicle, (g) said coacting pivotal connector means including
1. two transversely extended push pin members,
2. two pair of transversely extended half sleeve members, each pair having an internal diameter adapted for pivotally receiving one of said push pin members in bearing engagement therein, and
3. means for releasably locking the half sleeve members of each pair around a respective push pin member,
4. one of said push pin and pair of half sleeve members being connected to said vehicle and the other of said members being connected to the free end portions of the drive linkage legs.

6. A front mounted vehicle attachment steerable with and pushed by a vehicle, comprising:

(a) a portable frame positionable forwardly of the vehicle, said frame including front and rear transverse cross members and a pair of transversely spaced side members interconnecting said cross members, said cross members and side members arranged in a common plane so as to define a longitudinally and transversely extended load carrying platform, (b) a pair of caster wheels, (c) means for supporting the caster wheels on the frame at transversely spaced positions relative to the vehicle, (d) a drive linkage between the frame and vehicle, (e) coacting pivotal connector means on the drive linkage and vehicle for providing up and down pivotal movement of the drive linkage about a generally transverse axis relative to the vehicle, (f) means for providing a swivel connection between the rear frame cross member and drive linkage for pivotal movement of the frame about a longitudinal axis through said rear frame cross member and drive linkage, (g) said swivel connection securing said frame and drive linkage in longitudinally spaced-apart relation for pivotal movement of the frame free of obstruction with said drive linkage, (h) said caster wheels being of a height for supporting the front frame cross member at the height of said swivel connection for a generally horizontal disposition of said load carrying platform.

* * * * *